(12) United States Patent
Chang et al.

(10) Patent No.: US 12,494,983 B2
(45) Date of Patent: Dec. 9, 2025

(54) METHOD AND APPARATUS GENERATING A FORWARDING PATH, NETWORK DEVICE AND STORAGE MEDIUM

(71) Applicant: New H3C Technologies Co., Ltd., Hangzhou (CN)

(72) Inventors: Xiangqing Chang, Beijing (CN); Mengxiao Chen, Beijing (CN); Zhaoyan Lei, Beijing (CN); Tao Lin, Beijing (CN); Hao Li, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 71 days.

(21) Appl. No.: 18/001,746

(22) PCT Filed: Jun. 23, 2021

(86) PCT No.: PCT/CN2021/101914
§ 371 (c)(1),
(2) Date: Dec. 14, 2022

(87) PCT Pub. No.: WO2022/266905
PCT Pub. Date: Dec. 29, 2022

(65) Prior Publication Data
US 2024/0243989 A1  Jul. 18, 2024

(51) Int. Cl.
*H04L 45/02* (2022.01)
*H04L 41/12* (2022.01)

(52) U.S. Cl.
CPC .............. *H04L 45/02* (2013.01); *H04L 41/12* (2013.01)

(58) Field of Classification Search
CPC ................................ H04L 45/02; H04L 41/12
(Continued)

(56) References Cited

U.S. PATENT DOCUMENTS 10,637,598 B2 * 4/2020 Shen .................... H04L 41/0668
10,659,359 B2 * 5/2020 Li ............................ H04L 12/40
(Continued)

FOREIGN PATENT DOCUMENTS

CN          109831382          5/2019
CN          110661704 A  *   1/2020   ............. H04L 45/20
(Continued)

OTHER PUBLICATIONS

Office Action issued in corresponding Japanese Application No. 2022-577542, dated Feb. 6, 2024.
(Continued)

*Primary Examiner* — Anthony Mejia
(74) *Attorney, Agent, or Firm* — NORTON ROSE FULBRIGHT US LLP

(57) ABSTRACT

Method and apparatus for generating a forwarding path, network device and storage medium. Method comprises: obtaining topology information of first network nodes supporting a target path calculation algorithm; performing, using the target path calculation algorithm, path calculation based on the topology information of first network nodes to generate a first forwarding path; obtaining a second forwarding path from the source node to the tail node when there is a path interruption in the first forwarding path; determining, from the second forwarding path, first network nodes communicated with second network nodes obtaining node pairs; updating a next hop device of the first node in each node pair on the second forwarding path as the second node in the node pair obtaining a forwarding path communicated from the source node to the tail node. Second node is located behind first node in each node pair in a direction of second forwarding path.

13 Claims, 4 Drawing Sheets

(58) Field of Classification Search
USPC .......................................................... 370/252
See application file for complete search history.

(56) References Cited

U.S. PATENT DOCUMENTS

| | | | |
|---|---|---|---|
| 10,965,536 B2* | 3/2021 | ChoFleming, Jr. | ................ H04L 43/0858 |
| 2009/0232030 A1* | 9/2009 | Suzuki | .................... H04L 45/04 370/254 |
| 2015/0023150 A1* | 1/2015 | Chen | ..................... H04L 41/122 370/217 |
| 2018/0083856 A1* | 3/2018 | Wang | ....................... H04L 45/02 |
| 2020/0145319 A1 | 5/2020 | Joseph et al. | |
| 2020/0344151 A1 | 10/2020 | Joseph et al. | |
| 2022/0255853 A1* | 8/2022 | Peng | ....................... H04L 45/50 |
| 2024/0243989 A1* | 7/2024 | Chang | ..................... H04L 45/34 |

FOREIGN PATENT DOCUMENTS

| | | |
|---|---|---|
| CN | 110677341 | 1/2020 |
| CN | 112822106 | 5/2021 |
| JP | 2011166359 | 8/2011 |
| JP | 2015029346 | 2/2015 |
| JP | 2016146512 | 8/2016 |
| WO | WO 2006059787 | 6/2006 |
| WO | WO 2020/187308 | 9/2020 |
| WO | WO 2020/211609 | 10/2020 |

OTHER PUBLICATIONS

Britto et al. "IGP Flexible Algorithms (Flexalgo) in IP networks draft-bonica-lsr-ip-flexalgo-00", *IP Flexalgo*, 2020, 14 pages.
Extended European Search Report issued in corresponding European Application No. 21945362.8, dated Jun. 26, 2023.
Psenak et al. "IGP Flexible Algorithm draft-ietf-lsr-flex-algo-09.txt" *IGP Flexible Algorithm*, 2020, 36 pages.

* cited by examiner

METHOD AND APPARATUS GENERATING A FORWARDING PATH, NETWORK DEVICE AND STORAGE MEDIUM

CROSS-REFERENCE TO RELATED APPLICATIONS

The present application is a national phase under 35 U.S.C. § 371 of International Application No. PCT/CN2021/101914, filed Jun. 23, 2021, which is incorporated herein by reference in its entirety.

TECHNICAL FIELD

The present disclosure relates to the technical field of network communications, and in particular, to a method and apparatus for generating a forwarding path, a network device and a storage medium.

BACKGROUND

Segment Routing (SR) technology is a source routing technology. Based on the Flex-Algo technology in SR, network nodes in a network may support different path calculation algorithms, and the topology between network nodes supporting the same path calculation algorithm is considered as a logical topology. The Flex-Algo is a flexible algorithm of Interior Gateway Protocol (SR IGP).

When a packet is forwarded in a network based on the SR technology, the forwarding path of the packet is generated based on network nodes with physical links in the same logical topology.

However, in practice, the path calculation algorithm supported by network nodes may change with the network environment, so that the logical topology of the network nodes changes. For example, a path calculation algorithm supported by two network nodes in a logical topology is changed and the two network nodes no longer belong to the logical topology, which unfortunately causes physical links between other network nodes in the logical topology to be interrupted, so it is difficult to generate a communicated forwarding path according to the network nodes in the logical topology.

Therefore, a solution is needed that can still generate a communicated forwarding path when the logical topology changes.

SUMMARY

The present disclosure provides a method and apparatus for generating a forwarding path, a network device and a storage medium. A communicated forwarding path can be generated when logical topology changes. The specific technical solution is as follows.

According to a first aspect, examples of the present disclosure provide a method for generating a forwarding path generation, including:

obtaining topology information of first network nodes supporting a target path calculation algorithm;

performing, using the target path calculation algorithm, path calculation based on the topology information of the first network nodes to generate a first forwarding path, wherein the first forwarding path is a forwarding path from a designated source node to a designated tail node in the first network nodes;

obtaining a second forwarding path from the source node to the tail node when there is a path interruption in the first forwarding path, wherein the second forwarding path is a forwarding path determined based on topology information of all the first network nodes and topology information of second network nodes, and the second network nodes do not support the target path calculation algorithm;

determining, from the second forwarding path, first network nodes communicated with second network nodes to obtain node pairs; and updating a next hop device of the first node in each node pair on the second forwarding path as the second node in the node pair to obtain a forwarding path communicated from the source node to the tail node, the second node is located behind the first node in each node pair in a direction of the second forwarding path.

In an example of the present disclosure, obtaining a second forwarding path from the source node to the tail node comprises:

determining a third network node in the first forwarding path where a path interruption occurs and a first forwarding sub-path from the source node to the third network node; and generating a second forwarding sub-path from the third network node to the tail node based on topology information of fourth network nodes and topology information of second network nodes, the fourth network nodes being first network nodes that are not located in the first forwarding sub-path;

determining, from the second forwarding path, first network nodes communicated with second network nodes to obtain node pairs comprises:

determining, from the second forwarding sub-path, first network nodes in communication with second network nodes to obtain node pairs;

updating the next hop device of the first node in each node pair on the second forwarding path as the second node in the node pair to obtain a forwarding path communicated from the source node to the tail node comprises:

updating the next hop device of the first node in each node pair on the second forwarding sub-path as the second node in the node pair; and connecting the first forwarding sub-path and the updated second forwarding sub-path to obtain a forwarding path communicated from the source node to the tail node.

In an example of the present disclosure, generating a second forwarding sub-path from the third network node to the tail node based on topology information of fourth network nodes and topology information of second network nodes comprises:

performing path calculation based on the topology information of the fourth network nodes and the topology information of the second network nodes by using the target path calculation algorithm to generate a second forwarding sub-path from the third network node to the tail node;

after connecting the first forwarding sub-path and the updated second forwarding sub-path to obtain a forwarding path communicated from the source node to the tail node, the method further comprises:

when generating a segment list of the communicated forwarding path, adding a binding segment identifier (BSID) between a first segment identifier (SID) and a second SID, so that the first node in a first node pair invokes a SRv6 forwarding strategy corresponding to the BSID to select a forwarding path to the second node in the first node pair, wherein, the forwarding strategy corresponding to the BSID uses the target path calculation algorithm, the first node pair is a node pair in the communicated forwarding path, the first SID is a SID corresponding to the first node in the first node pair, and the second SID is a SID corresponding to the second node in the first node pair.

In an example of the present disclosure, the method for generating a forwarding path further includes:

when generating the segment list of the communicated forwarding path, adding security authentication instructions and instruction parameters of the security authentication instructions into function fields of a SID corresponding to nodes in the first node pair.

In an example of the present disclosure, wherein generating a second forwarding sub-path from the third network node to the tail node based on topology information of fourth network nodes and topology information of second network nodes comprises:

performing path calculation based on the topology information of the fourth network nodes and the topology information of the second network nodes by using a shortest path first algorithm to generate the second forwarding sub-path from the third network node to the tail node.

In an example of the present disclosure, obtaining a second forwarding path from the source node to the tail node comprises:

sending a path request to a control node; and
receiving a second forwarding path fed back by the control node, wherein the second forwarding path is a forwarding path from the source node to the tail node determined by the control node based on topology information of first network nodes and topology information of second network nodes.

According to a second aspect, examples of the present disclosure provide an apparatus for generating a forwarding path, including:

a topology obtaining module configured to obtain topology information of first network nodes supporting a target path calculation algorithm;

a path generating module configured to perform, using the target path calculation algorithm, path calculation based on the topology information of the first network nodes to generate a first forwarding path, wherein the first forwarding path is a forwarding path from a designated source node to a designated tail node in the first network nodes;

a path obtaining module configured to obtain a second forwarding path from the source node to the tail node when there is a path interruption in the first forwarding path, wherein the second forwarding path is a forwarding path determined based on topology information of all the first network nodes and topology information of second network nodes, and the second network nodes do not support the target path calculation algorithm;

a node determining module configured to determine, from the second forwarding path, first network nodes communicated with second network nodes to obtain node pairs; and a next hop updating module configured to update the next hop device of the first node in each node pair on the second forwarding path as the second node in the node pair to obtain a forwarding path communicated from the source node to the tail node, the second node is located behind the first node in each node pair in a direction of the second forwarding path.

In an example of the present disclosure, the path obtaining module comprises:

a sub-path determining unit configured to determine a third network node in the first forwarding path where a path interruption occurs and a first forwarding sub-path from the source node to the third network node when there is a path interruption in the first forwarding path;

a sub-path generating unit configured to generate a second forwarding sub-path from the third network node to the tail node based on topology information of fourth network nodes and topology information of second network nodes, the fourth network nodes being first network nodes that are not located in the first forwarding sub-path;

the node determining module is further configured to determine, from the second forwarding sub-path, first network nodes in communication with second network nodes to obtain node pairs;

the next hop updating module is further configured to update the next hop device of the first node in each node pair on the second forwarding sub-path as the second node in the node pair; connecting the first forwarding sub-path and the updated second forwarding sub-path to obtain a forwarding path communicated from the source node to the tail node.

In an example of the present disclosure, the sub-path generating unit is further configured to perform path calculation based on the topology information of the fourth network nodes and the topology information of the second network nodes by using the target path calculation algorithm to generate a second forwarding sub-path from the third network node to the tail node;

the apparatus further comprises:

a BSID adding module configured to, after the next hop updating module obtains the forwarding path communicated from the source node to the tail node, when generating a segment list of the communicated forwarding path, adding a binding segment identifier (BSID) between a first segment identifier (SID) and a second SID, so that the first node in a first node pair invokes a SRv6 forwarding strategy corresponding to the BSID to select a forwarding path to the second node in the first node pair, wherein, the forwarding strategy corresponding to the BSID uses the target path calculation algorithm, the first node pair is a node pair in the communicated forwarding path, the first SID is a SID corresponding to the first node in the first node pair, and the second SID is a SID corresponding to the second node in the first node pair.

In an example of the present disclosure, the apparatus for generating a forwarding path further includes:

an information adding module configured to, adding security authentication instructions and instruction parameters of the security authentication instructions into function fields of a SID corresponding to nodes in the first node pair when the segment list of the communicated forwarding path is generated.

In an example of the disclosure, the sub-path generating unit is further configured to perform path calculation based on the topology information of the fourth network nodes and the topology information of the second network nodes by using a shortest path first algorithm to generate the second forwarding sub-path from the third network node to the tail node.

In an example of the present disclosure, the path obtaining module is further configured to send a path request to a control node when there is a path interruption in the first forwarding path; receive a second forwarding path fed back by the control node, wherein the second forwarding path is a forwarding path from the source node to the tail node determined by the control node based on topology information of first network nodes and topology information of second network nodes.

In a third aspect, examples of the present disclosure provide a network device, including a processor and a machine-readable storage medium having processor executable instructions stored thereon which, when executed by the processor, cause the processor to implement steps of the method for generating a forwarding path according to any of the above first aspects.

In a fourth aspect, examples of the present disclosure provide a machine-readable storage medium having machine-executable instructions stored thereon which, when called and executed by a processor, cause the processor to implement steps of the method for generating a forwarding path according to any of the above first aspects.

As can be seen from the above, when a forwarding path is generated by applying the solution provided in examples of the present disclosure, if there is a path interruption in the generated first forwarding path by using the target path calculation algorithm to perform path calculation on topology information of the first network nodes, it is not considered that a communicated forwarding path cannot be generated, but a communicated forwarding path is generated by means of the second network nodes that do not support the target path calculation algorithm. Based on this, even if the physical link between the network nodes in the logical topology is interrupted due to a change in logical topology, the generation of the communicated forwarding path can be ensured.

BRIEF DESCRIPTION OF THE DRAWINGS

In order to illustrate examples of the present disclosure and the technical solutions of the prior art more clearly, the accompanying drawings required in examples and the prior art are described briefly below. Obviously, the accompanying drawings in the following description are merely some examples of the present disclosure, and those skilled in the art can also obtain other drawings according to the accompanying drawings.

DETAILED DESCRIPTION

Figure 1A:
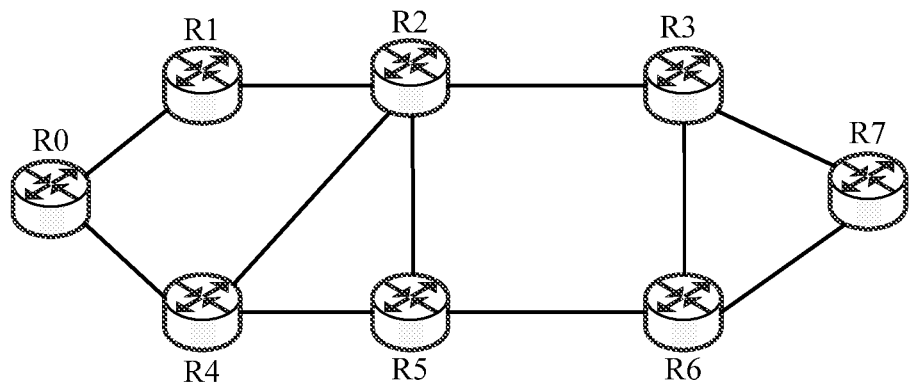
FIG. 1a is a schematic diagram of a first network topology according to an example of the present disclosure.

In order to make the objects, technical solutions, and advantages of the present disclosure more apparent, the present disclosure will be further described in detail below with reference to the accompanying drawings and examples. Obviously, the described examples are merely a part of examples of the present disclosure, rather than all examples. All other examples obtained by those skilled in the art based on examples in the present disclosure belong to the scope of protection of the present disclosure. In addition, examples described below are merely for illustrating and explaining the technical solutions provided by examples of the present disclosure, and are not intended to limit the present disclosure. Furthermore, examples and the features in examples of the present disclosure can be combined with each other without conflict.

In state of art, the generation of a forwarding path for a network based on Flex-Algo technology in SR relies on physical links between network nodes in the same logical topology. Variation in logical topology, however, may interrupt physical links between network nodes in the logical topology, which in turn causes trouble in generating a communicated forwarding path. In light of this, examples of the present disclosure provide a method, an apparatus for generating a forwarding path, a network device, and a storage medium.

The above technical problem is described below with reference to FIG. 1a to FIG. 1c through specific instances.

In the network based on SR Flex-Algo technology, each network node may issue its supported path calculation algorithm. The topology between network nodes supporting the same path calculation algorithm is considered as a logical topology. In this way, the physical topology of the whole network is divided into a plurality of logical topologies. Each logical topology may be referred to as a network fragment, providing users with different types or different levels of services.

In addition, SR technology allows the source node in the forwarding path to insert segment information of the forwarding path in a packet. In case that the network nodes communicate based on Internet Protocol Version 6 (IPv6), the source node inserts a segment list in the packet. For ease of description, the packet with an inserted segment list is referred to as an SRv6 packet. The segment list of forwarding path indicates the order in which network nodes in the forwarding path forward a packet. In this way, after receiving the SRv6 packet, the network nodes can forward the packet according to the segment list carried in the SRv6 packet.

In view of the above circumstances, a forwarding path needs to be generated before a packet is forwarded. In SR Flex-Algo technology known in the art, a forwarding path is generated based on logical topologies of network nodes. That is, network nodes included in the generated forwarding path are network nodes included in the same logical topology, and thus support the same path calculation algorithm. In addition, the generation of forwarding path depends on physical links between network nodes in the logical topology. Once the physical links between the network nodes in the logical topology cannot connect the designated source node with the designated tail node, the forwarding path cannot be successfully generated.

Referring to FIG. 1a, showing a schematic diagram of physical topology of a network. The black solid lines represent physical links between network nodes, and R0-R7 represent eight network nodes.

It is assumed that the network nodes R0, R1, R2, R6 and R7 support path calculation algorithm 1, and the network nodes R0, R4, R2, R3 and R7 support path calculation algorithm 2.

In this way, R0, R1, R2, R6 and R7 belong to a logical topology. From the physical topology shown in FIG. 1a, the logical topologies shown in FIG. 1b can be obtained. Since R3 and R5 do not support path calculation algorithm 1, the physical link between R2 and R6 is interrupted. Therefore, based on the physical links between R0, R1, R2, R6 and R7, a forwarding path communicated from R0 to R7 cannot be generated.

R0, R4, R2, R3 and R7 belong to a logical topology. From the physical topology shown in FIG. 1a, the logical topology shown in FIG. 1c can be obtained. This logical topology is communicated (not interrupted), and the forwarding path communicated from R0 to R7 can be generated through R0, R4, R2, R3 and R7.

Hereinafter, a method, an apparatus for generating a forwarding path, a network device, and a storage medium provided by examples of the present disclosure will be described in detail through specific examples.

First, the entity on which examples of the present disclosure can be implemented are described.

The entity is a network node hosting an FCE (Path Calculation Element), which is referred to as an execution node for ease of description. The execution node may be a routing device or a control node in a network, wherein the control node is a device having a control function in the network.

In the case that the above execution node is a routing device, the above execution node may be a source node designated in a forwarding path to be generated.

Figure 2:
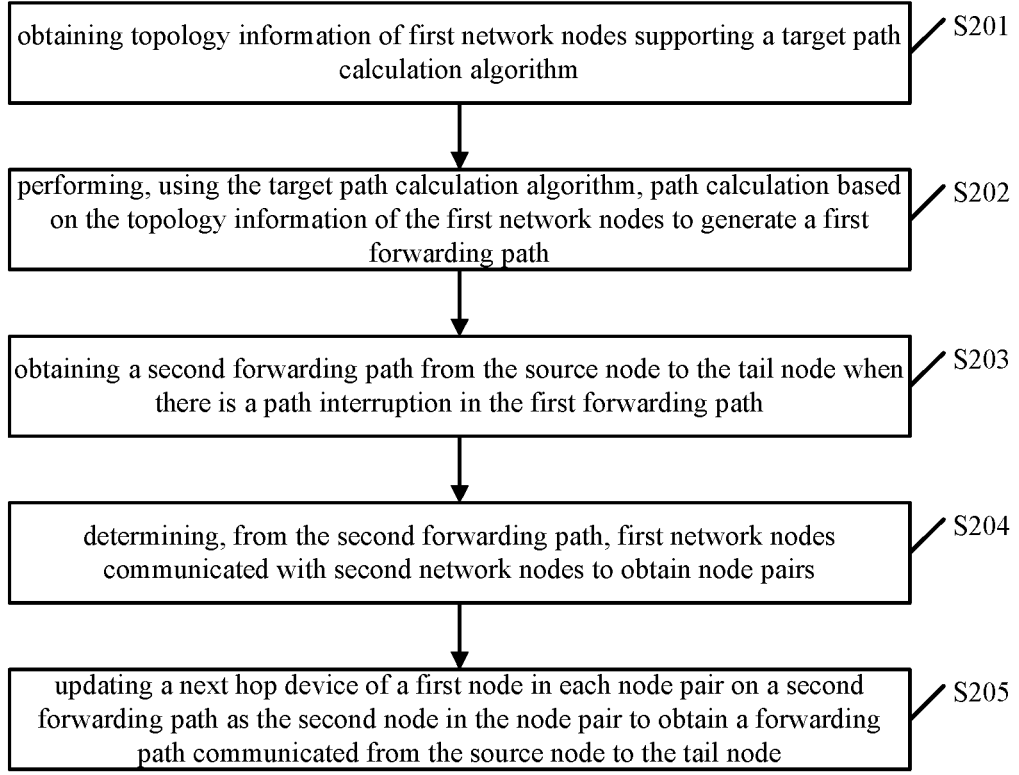
FIG. 2 is a schematic flowchart of a first method for generating a forwarding path according to an example of the present disclosure.

Referring to FIG. 2, showing a schematic flowchart of a first method for generating a forwarding path according to an example of the present disclosure. The method includes operations as shown in blocks S201-S205 and is performed on the execution node.

At block S201, topology information of first network nodes supporting a target path calculation algorithm is obtained.

The network node can issue the path calculation algorithm it supports in the SR-based network, so that the execution node can have knowledge of path calculation algorithms supported by network nodes. In view of this, in block 201, the execution node may have knowledge of the first network nodes supporting the target path calculation algorithm through the notification issued by network nodes.

One network node may support one path calculation algorithm, and may also support a plurality of path calculation algorithms.

The above path calculation algorithm refers to an algorithm for computing a forwarding path.

For example, the above path calculation algorithm may be Flex-Algo. Each Flex-Algo algorithm can be represented by a value of 128-255 intervals.

At S202, path calculation is performed, using the target path calculation algorithm, based on topology information of the first network nodes to generate a first forwarding path.

The first forwarding path is a forwarding path from a designated source node to a designated tail node in the first network nodes.

Specifically, the execution node may perform path calculation based on the topology information of the first network nodes under constraints on path calculation posed by the target path calculation algorithm.

For example, the Flex-Algo may include a group of constraints. The above constraints may be constraints on link indicator. For example, the link indicator may be a delay indicator. The above constraints may be constraints on path calculation algorithm. For example, the above path calcu-lation algorithm may be an Shortest Path First (SPF) algo-rithm. The above constraints may be constraints on topology information, which for example specify links that need to be included in the forwarding path or links that need to be removed. Based on this, in case that the above target path calculation algorithm is Flex-Algo, path calculation may be performed based on the topology information of the first network nodes under constraints included in Flex-Algo.

At block S203, a second forwarding path from the source node to the tail node is obtained, when there is a path interruption in the first forwarding path.

The second forwarding path is a forwarding path determined based on topology information of all the first network nodes and topology information of second network nodes, and the second network nodes do not support the target path calculation algorithm.

The second forwarding path may be a complete forwarding path from the source node to the tail node. The second forwarding path may also be a set of a plurality of forwarding sub-paths, and in this case, the plurality of forwarding sub-paths may be connected to form a complete forwarding path from the source node to the tail node.

Specifically, if physical links between the first network nodes cannot communicate the source node with the tail node, the generated first forwarding path is a partial forwarding path from the source node to the tail node. In this case, the last hop of the first forwarding path is a first network node that is not in communication with other first network nodes, instead of the above tail node. In view of this, if the last hop in the first forwarding path is not the above tail node, the execution node may consider that there is a path interruption in the first forwarding path.

There are second network nodes in the network in addition to the first network nodes. There may be physical links between the first network nodes, and there may also be physical links between the first network nodes and the second network nodes. In this operation, after the execution node determines that there is a path interruption in the first forwarding path, in addition to the first network node, the second network nodes are also included in the path calculation process so as to communicate two first network nodes, through physical links between first network nodes and second network nodes and physical links between the second network nodes and the second network nodes.

In an example of the present disclosure, the execution node may perform path calculation based on the topology information of all the first network nodes and the topology information of all the second network nodes, so as to obtain a second forwarding path from the source node to the tail node.

A shortest path first algorithm or the above target path calculation algorithm may be used during path calculation.

At block S204, first network nodes communicated with second network nodes are determined from the second forwarding path, so as to obtain node pairs.

The second forwarding path may have a sub-path communicated by the second network nodes, or may have a plurality of sub-paths communicated by the second network nodes.

In view of the above circumstances, after obtaining the second forwarding path, the execution node may check each network node hop-by-hop in the direction from the source node to the tail node, determine a first network node directly connected to a second network node as the first node of a sub-path, and determine the next first network node directly connected to a second network node as the second node of the sub-path. The above first node and second node form a node pair, and the second node is located behind the first node in the direction of the second forwarding path.

In this way, in case that there are a plurality of sub-paths in the second forwarding path, a plurality of node pairs can be obtained in this step.

At block S205: a next hop device of the first node in each node pair on the second forwarding path is updated as the second node in the node pair to obtain a forwarding path communicated from the source node to the tail node.

In each of the pairs, the second node is located behind the first node in the direction of the second forwarding path.

In the second forwarding path, the second node in each node pair taken as the next-hop device of the first node in the node pair. This updates the second forwarding path, and remove second network nodes from the second forwarding path, so that the second forwarding path is constituted by first network nodes. This not only ensures that network nodes in the forwarding path all come from the same logical topology, but also ensures that a forwarding path is successfully generated when physical links between the first network nodes are not communicated.

Figure 1B:
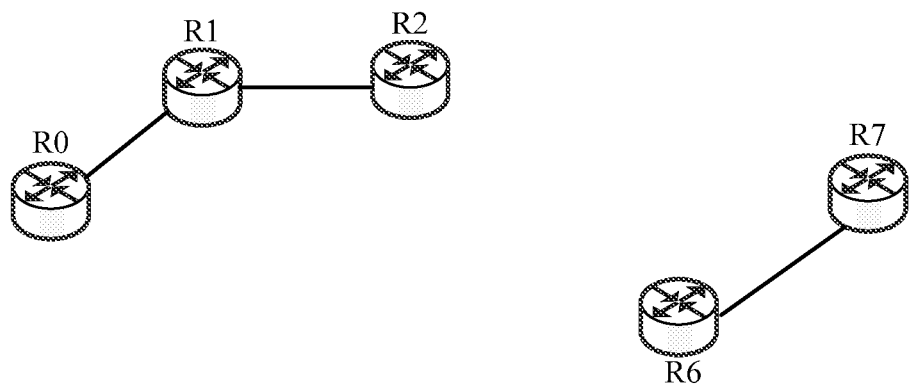
FIG. 1b is a schematic diagram of a second network topology according to an example of the present disclosure.
Figure 1C:
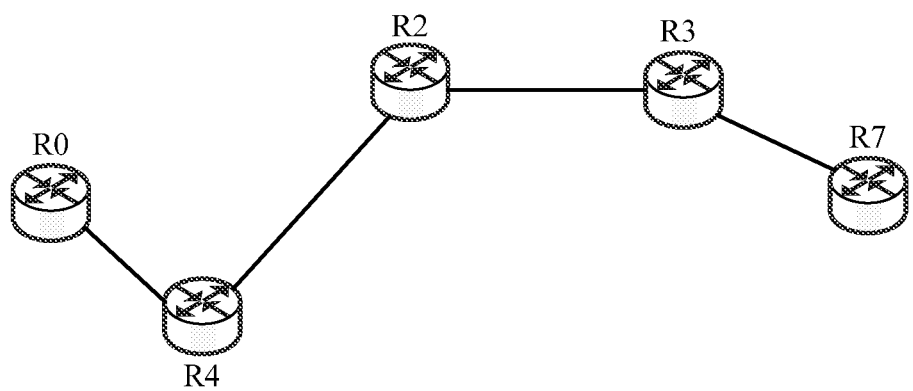
FIG. 1c is a schematic diagram of a third network topology according to an example of the present disclosure.
Figure 1D:
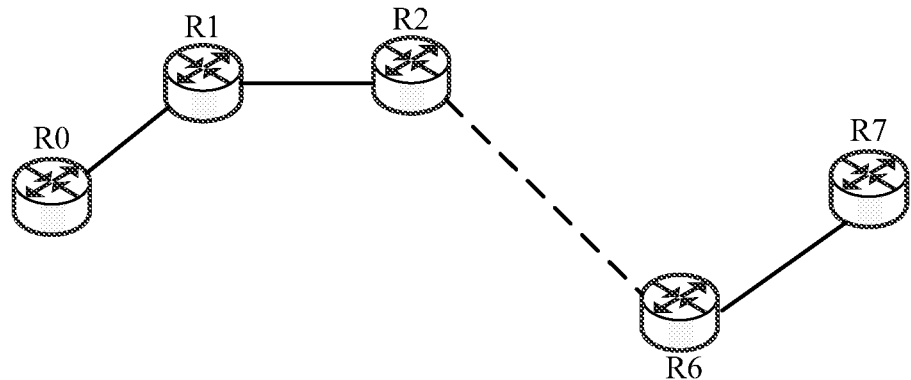
FIG. 1d is a schematic diagram of a fourth network topology according to an example of the present disclosure.

Referring to FIG. 1d, showing a forwarding path generated by applying the solution provided in the example of the present disclosure in a case that there is a path interruption in the forwarding path shown in FIG. 1b. In FIG. 1d, R2 and R6 are communicated by a dotted line, indicating that R2 is communicated with R6 through a second network node.

After the forwarding path is generated according to the foregoing operations, when SRv6 packet is forwarded by first network nodes in the forwarding path, the next-hop devices can be known based on the segment list of the forwarding path carried by the packet header of the SRv6 packet. At this time, even if there is no physical link between first network nodes and the next-hop device, the first network node can perform path calculation based on the shortest path first algorithm or the target path calculation algorithm to obtain a forwarding path between itself and the next hop device, so that the SRv6 packet is forwarded to the next hop device in the obtained forwarding path.

As can be seen from the above, when a forwarding path is generated by applying the solution provided in examples of the present disclosure, if there is a path interruption in the generated first forwarding path by using the target path calculation algorithm to perform path calculation on topology information of the first network nodes, it is not considered that a communicated forwarding path cannot be generated, but a communicated forwarding path is generated by means of the second network nodes that do not support the target path calculation algorithm. Based on this, even if the physical link between network nodes in a logical topology is interrupted due to a change in logical topology, the generation of a communicated forwarding path can be ensured.

Specifically, in addition to the execution node, the above second forwarding path can also be generated by a control node having a control function in the network. The control node can not only obtain path calculation algorithms notified by network nodes in the network, but also collect topology information of network nodes in the network through BGP Link-State (BGP-LS).

In view of this, in an example of the present disclosure, in block S203, the execution node obtains the second forwarding path through the control node.

Specifically, the execution node sends a path request to the control node, where the path request is used to request the control node to generate a second forwarding path. The control node determines the second forwarding path from the source node to the tail node based on the topology information of all the first network nodes and the topology information of the second network nodes, and feeds back the second forwarding path to the above execution node, so that the above execution node obtains the second forwarding path.

The control node may use the shortest path first algorithm to determine the second forwarding path, or use the target path calculation algorithm to determine the second forwarding path, of course, other algorithms may also be used to determine the second forwarding path, which is not limited in the present disclosure.

As can be seen from the above, in the solution provided in this example, since the control node can know the path calculation algorithm supported by network nodes in the network and the topology information of the network nodes, a relatively accurate forwarding path can be generated. In addition, the control node undertakes the work of generating the second forwarding path, thereby reducing the work pressure of network node as an execution entity.

Figure 3:
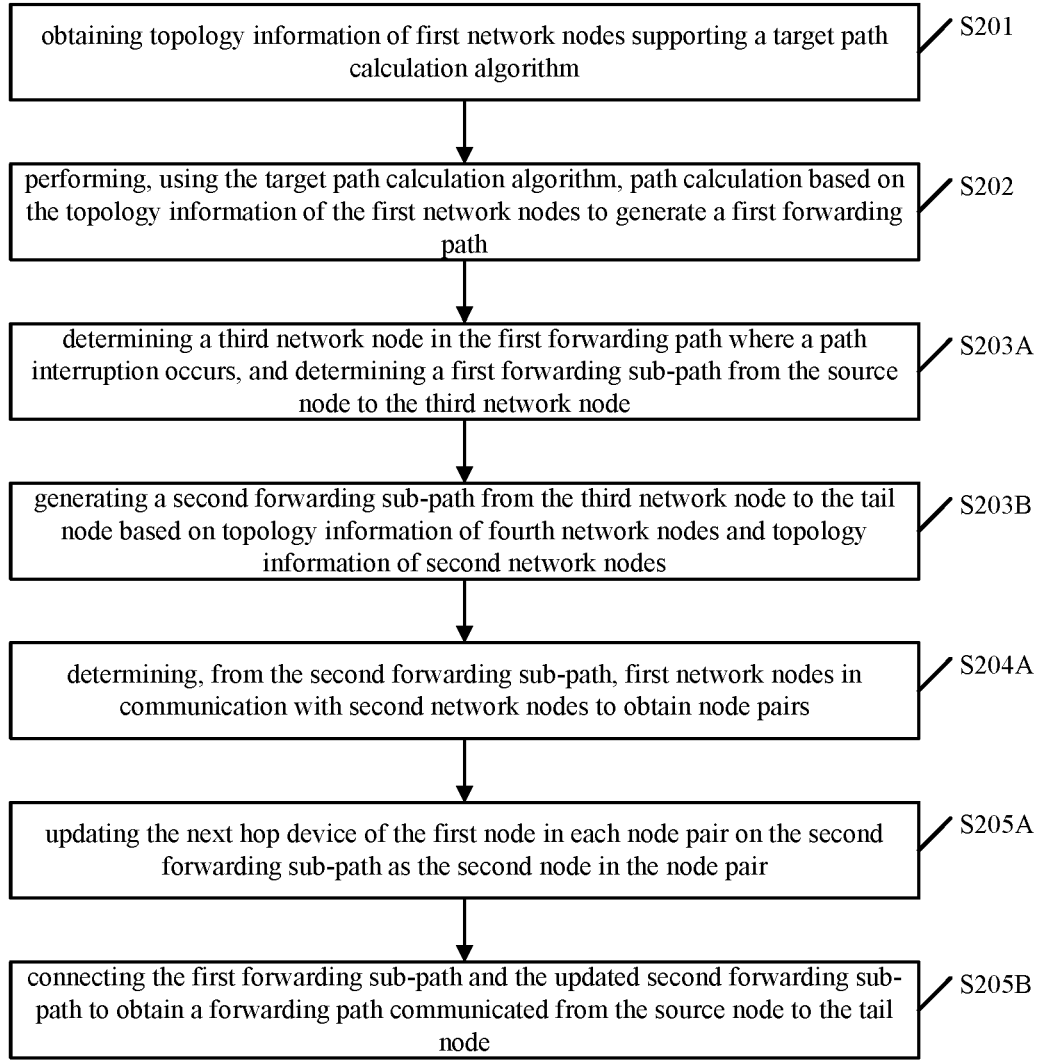
FIG. 3 is a schematic flowchart of a second method for generating a forwarding path according to an example of the present disclosure.

In an example of the present disclosure, referring to FIG. 3, a flowchart of a second method for forwarding path generation is provided, and compared with the foregoing example shown in FIG. 2, the operation of block S203, i.e., obtaining a second forwarding path from the source node to the tail node when there is a path interruption in the first forwarding path, includes the operations S203A and S203B.

At block S203A: a third network node in the first forwarding path where a path interruption occurs is determined, and a first forwarding sub-path from the source node to the third network node is determined.

Specifically, after the execution node uses the target path calculation algorithm to generate the first forwarding path, a last hop in the first forwarding path can be detected to detect whether the last hop is the tail node. If the last hop is not the tail node, it is determined that there is a path interruption in the first forwarding path, and the above last hop is referred to as a third network node. The above first forwarding path is a forwarding path from the source node to the third network node, and therefore, the first forwarding path may be used as the first forwarding sub-path in this step.

At block S203B: a second forwarding sub-path from the third network node to the tail node is generated based on topology information of fourth network nodes and topology information of second network nodes.

The fourth network nodes are first network nodes that are not located in the first forwarding sub-path.

Since the first forwarding sub-path is a forwarding path from the source node to the third network node, the packet cannot be forwarded to the tail node through this forwarding path. Further, since the third network node is unable to communicate with the fourth network nodes, and the third network node may be able to communicate with the fourth network node by means of second network nodes, a second forwarding sub-path from the third network node to the tail node is generated in this operation based on the topology information of the fourth network nodes and the topology information of the second network nodes.

Various path calculation algorithms may be used by the execution node to generate the second forwarding sub-path, which are specifically described in the subsequent examples and will not be described in detail here.

On the basis of the above, the operation of block S204, i.e., determining, from the second forwarding path, includes the operation of block 204A.

At block S204A: first network nodes in communication with second network nodes are determined from the second forwarding sub-path to obtain node pairs.

Since the first forwarding sub-path is a forwarding path generated for the first network nodes by using the target path calculation algorithm, there is definitely no first network nodes communicated with the second network nodes in the first forwarding sub-path. In order to improve the efficiency of forwarding path generation, in this step, the first network nodes communicated to the second network nodes may be determined in the second forwarding sub-path, so as to obtain node pairs.

Specifically, the execution node may check network nodes hop-by-hop in the direction from the third network node to the tail node, determine a first network node directly connected to the second network nodes as the first node, and determine a next first network node directly connected to the second network nodes as the second node. The above first node and the second node form a node pair.

The operation of block S205, i.e., updating the next hop device of the first node in each node pair on the second forwarding path as the second node in the node pair to obtain a forwarding path communicated from the source node to the tail node, includes operations in blocks S205A and S205B.

At block S205A: the next hop device of the first node in each node pair on the second forwarding sub-path is updated as the second node in the node pair.

The execution node takes the second node in each node pair as the next-hop device of the first node in the node pair, such that the second forwarding sub-path is updated, and second network nodes can be removed from the second forwarding sub-path. As such, the second forwarding sub-path is constituted by first network nodes.

At block S205B, the first forwarding sub-path and the updated second forwarding sub-path are connected to obtain a forwarding path communicated from the source node to the tail node.

Since the first forwarding sub-path is a forwarding path from the source node to the third network node, and the second forwarding sub-path is a forwarding path from the third network node to the tail node, both the first forwarding sub-path and the second forwarding sub-path are parts of the forwarding path from the source node to the tail node, and the third network node is present in both the first forwarding sub-path and the second forwarding sub-path. Therefore, the first forwarding sub-path and the second forwarding sub-path can be connected through the third network node to obtain a complete forwarding path from the source node to the tail node.

As can be seen from the above, in the solution provided in this example, the first forwarding path obtained by using the target path calculation algorithm is used as the first forwarding sub-path. This ensures that network nodes in the first forwarding sub-path are all first network nodes. Then node pairs are determined for the second forwarding sub-path, the efficiency of forwarding path generation is improved while ensuring that the determined node pairs are accurate.

The following describes how to generate the second forwarding sub-path through two different examples.

In an example of the present disclosure, the operation of block S203B, i.e., the execution node generating a second forwarding sub-path from the third network node to the tail node based on topology information of fourth network nodes and topology information of second network nodes may include: performing path calculation based on the topology information of the fourth network nodes and the topology information of the second network nodes by using the target path calculation algorithm to generate a second forwarding sub-path from the third network node to the tail node.

Since the second forwarding sub-path is generated by using the target path calculation algorithm, in order to ensure that the first node in each node pair can accurately forward a SRv6 packet to the second node in the node pair, the first node needs to know the path calculation algorithm through which the second forwarding sub-path is generated.

In view of this, after connecting the first forwarding sub-path and the updated second forwarding sub-path to obtain a forwarding path communicated from the source node to the tail node in the operation of block S205B, a Binding Segment Identifier (BSID) may be added between a first Segment Identifier (SID) and a second SID when the execution node generates a segment list of the above communicated forwarding path, so that the first node in the first node pair invokes a SRv6 forwarding strategy corresponding to the BSID to select a forwarding path to the second node in the first node pair. This can ensure that when the source node adds the SID to the packet, it also successfully adds the BSID to the packet.

The forwarding strategy corresponding to the BSID uses the target path calculation algorithm, the first node pair is a node pair in the communicated forwarding path, the first SID is a SID corresponding to the first node in the first node pair, and the second SID is a SID corresponding to the second node in the first node pair.

The above segment list stores a plurality of SIDs, each SID corresponding to a network node in the forwarding path. The SID corresponding to each network node may store: the identity of the network node, an operation instruction that a network node needs to perform on the SRv6 packet, and instruction parameters of the above operation instruction, etc.

Since a BSID is added between the first SID and the second SID when generating a segment list of the communicated forwarding path in the solution provided in this example, and the path calculation algorithm used by the forwarding strategy corresponding to the BSID is the target path calculation algorithm and the second forwarding sub-path before update is also generated by using the target path calculation algorithm, the first node in the node pair can perform path selection according to the second forwarding sub-path before update, and then forward a SRv6 packet to the second node in the node pair, thereby effectively ensuring accurate forwarding of the SRv6 packet.

In an implementation, since the SRv6 packet is to pass the second network node when being forwarded from the first node to the second node in each node pair, in order to ensure the security of the forwarded SRv6 packet, a security authentication instruction and instruction parameters of the security authentication instruction may also be added to function fields of a SID corresponding to each node in the first node pair when the execution node generates a segment list of the communicated forwarding path. In this way, after the first node and the second node in each node pair receive the SRv6 packet to be forwarded, the security authentication instruction carried in the SID can be executed according to the instruction parameters carried in the SID, thereby ensuring the security of the SRv6 packet that is to be forwarded. In this way, it can also be ensured that the safety authentication instruction and the instruction parameters of the safety authentication instruction are successfully added to the packet when the source node adds the SID to the packet.

For example, the above security authentication instruction may be a security authentication instruction for IPSec or a security authentication instruction for SRv6 HMAC.

In another example of the present disclosure, a shortest path first algorithm may be used as a default path calculation algorithm. In this case, in block S203B, in which the execution node generates a second forwarding sub-path from the third network node to the tail node based on topology information of fourth network nodes and topology information of second network nodes, the shortest path first algorithm may be used to perform path calculation on the topology information of the fourth network nodes and the topology information of the second network nodes, so as to generate a second forwarding sub-path from the third network node to the tail node. Since the shortest path first algorithm is the default path calculation algorithm, it may not be otherwise notified that the path calculation algorithm used when the first node generates the second forwarding sub-path in the node pair is the shortest path first algorithm.

In this way, after the first node in the node pair receives a SRv6 packet, it can directly select a path according to the shortest path first algorithm, and then forward the SRv6 packet to the second node in the node pair. In this way, not only can the SRv6 packet forwarding be accurately realized, but also the amount of information carried in the SRv6 packet can be reduced.

The following describes a forwarding path generation scheme provided in this example with reference to topology diagrams shown in FIG. 1b and FIG. 1d.

It is assumed that the target path calculation algorithm is the aforementioned path calculation algorithm 1. The network nodes R0, R1, R2, R6, and R7 all support the path algorithm 1, that is, the first network node includes: R0, R1, R2, R6, R7, such that the second network node comprises: R3, R4, R5.

The designated source node is R0, and the designated tail node is: R7.

Although there are physical links between R0, R1 and R2, and there is a physical link between R6 and R7, the physical links between R0, R1, R2, R6 and R7 cannot connect R0 to R7 because there is no physical link between R2 and R6. Therefore, path calculation is performed based on the topology information of R0, R1, R2, R6, and R7 by using the path calculation algorithm 1. The generated first forwarding path is R0→R1→R2, and does not include the path R6→R7, and the last hop of the first forwarding path is R2, but not R7. This indicates that there is a path interruption in the first forwarding path.

At this time, the third network node is R2, and the first forwarding sub-path is: R0→R1→R2. The fourth network node comprises: R6 and R7.

In one case, the shortest path first algorithm is used to perform path calculation based on the topology information of R6, R7, R3, R4, and R5 to generate a second forwarding sub-path. If the generated second forwarding sub-path is: R2→R3→R6→R7, then a node pair includes R2 and R6. The first node in this node pair is R2, and the second node is R6. R6 in the second forwarding sub-path is taken as the next hop device of R2, then the updated second forwarding sub-path is: R2→R6→R7. The communicated forwarding path obtained by connecting the first forwarding sub-path and the second forwarding sub-path is: R0→R1→R2→R6→R7.

In this case, when the segment list of the communicated forwarding path is generated, the segment list includes: SIDs in sequence corresponding to R0, R1, R2, R6 and R7. When R2 receives the SRv6 packet, it knows from the fragment list that the next hop device is: R6. Since R2 can know that there is no physical link with R6, when R2 forwards a SRv6 packet to R6, a shortest path first algorithm is used to calculate a path for forwarding the SRv6 packet to R6. It can be calculated that the SRv6 packet is forwarded to R6 through R3. As such, R2 forwards the SRv6 packet to R3, and then R3 forwards the SRv6 packet to R6.

In another case, the path calculation algorithm 1 is used to perform path calculation based on the topology information of R6, R7, R3, R4, and R5 to generate a second forwarding sub-path. If the generated second forwarding sub-path is: R2→R5→R6→R7, then a node pair includes R2 and R6. The first node in the node pair is R2, and the second node is R6. R6 in the second forwarding sub-path is taken as the next-hop device of R2. Then updated second forwarding sub-path is: R2→R6→R7. The communicated forwarding path obtained by connecting the first forwarding sub-path and the second forwarding sub-path is: R0→R1→R2→R6→R7.

In this case, when the segment list of the communicated forwarding path is generated, the segment list sequentially includes: SIDs corresponding to R0, R1, R2, R6 and R7, and BSID is added between SID corresponding to R2 and SID corresponding to R6. When R2 receives the SRv6 packet, it can know from the segment list that the next hop device is: R6. Since R2 can know that there is no physical link with R6, when the R2 forwards a SRv6 packet to R6, the SRv6 forwarding strategy corresponding to BSID is invoked to select a forwarding path to R6. Since the path calculation algorithm used by the SRv6 forwarding strategy corresponding to BSID is: the path calculation algorithm 1, it can be calculated that R2 forwards SRv6 packets to R6 through R5. As such, R2 forwards SRv6 packet to R5, and then R5 forwards the SRv6 packet to R6.

Corresponding to the forwarding path generation method, examples of the disclosure also provide a forwarding path generation device.

Figure 4:
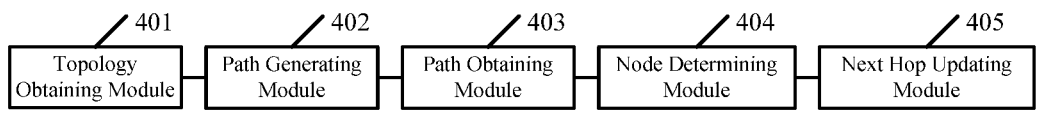
FIG. 4 is a schematic structural diagram of a first apparatus for generating a forwarding path according to an example of the present disclosure.

Referring to FIG. 4, FIG. 4 is a schematic structural diagram of an apparatus for generating a forwarding path provided in an example of the present disclosure, the apparatus includes a topology obtaining module 401, a path generating module 402, a path obtaining module 403, a node determining module 404, and a next hop updating module 405.

The topology obtaining module 401 is configured to obtain topology information of a first network node that supports a target path calculation algorithm;

The path generating module 402 is configured to perform, using the target path calculation algorithm, path calculation based on the topology information of the first network nodes to generate a first forwarding path, wherein the first forwarding path is a forwarding path from a designated source node to a designated tail node in the first network nodes.

The path obtaining module 403 is configured to obtain a second forwarding path from the source node to the tail node when there is a path interruption in the first forwarding path, wherein the second forwarding path is a forwarding path determined based on topology information of all the first network nodes and topology information of second network nodes, and the second network nodes do not support the target path calculation algorithm.

The node determining module 404 is configured to determine, from the second forwarding path, first network nodes communicated with second network nodes to obtain node pairs.

The next hop updating module 405 is configured to update the next hop device of the first node in each node pair on the second forwarding path as the second node in the node pair to obtain a forwarding path communicated from the source node to the tail node, the second node is located behind the first node in each node pair in a direction of the second forwarding path.

As can be seen from the above, when a forwarding path is generated by applying the solution provided in examples of the present disclosure, if there is a path interruption in the first forwarding path generated by using the target path calculation algorithm to perform path calculation based on topology information of the first network nodes, it is not considered that a communicated forwarding path cannot be generated, but a communicated forwarding path can be generated by means of the second network nodes that do not support the target path calculation algorithm. Based on this, even if the physical link between the network nodes in the logical topology is interrupted due to a change in the logical topology, the generation of the communicated forwarding path can be ensured.

Figure 5:
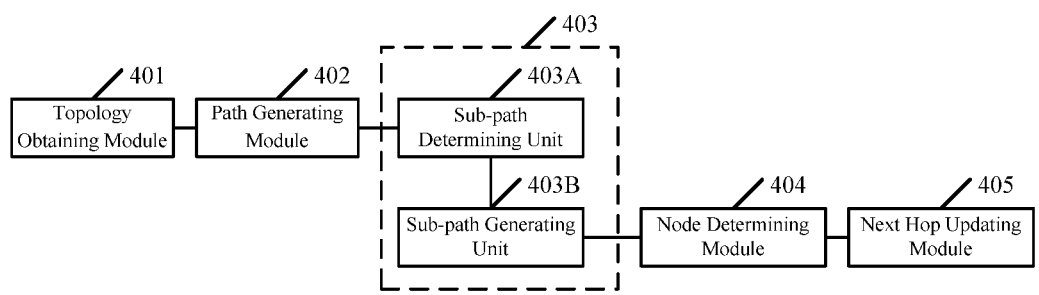
FIG. 5 is a schematic structural diagram of a second apparatus for generating a forwarding path according to an example of the present disclosure.

In an example of the present disclosure, referring to FIG. 5, a second apparatus for generating a forwarding path is provided. Compared with the foregoing example shown in FIG. 4, the path obtaining module 403 includes a sub-path determining unit 403A and a sub-path generating unit 403B.

The sub-path determining unit 403A is configured to determine a third network node in the first forwarding path where a path interruption occurs and a first forwarding sub-path from the source node to the third network node when there is a path interruption in the first forwarding path.

The sub-path generating unit 403B is configured to generate a second forwarding sub-path from the third network node to the tail node based on topology information of fourth network nodes and topology information of second network nodes, the fourth network nodes being first network nodes that are not located in the first forwarding sub-path.

The node determining module 404 is specifically configured to determine, from the second forwarding sub-path, first network nodes in communication with second network nodes to obtain node pairs.

The next hop updating module 405 is specifically configured to update the next hop device of the first node in each node pair on the second forwarding sub-path as the second node in the node pair; connecting the first forwarding sub-path and the updated second forwarding sub-path to obtain a forwarding path communicated from the source node to the tail node.

As can be seen from the above, in the solution provided in this example, the first forwarding path obtained by using the target path calculation algorithm is used as the first forwarding sub-path, so that it is ensured that the network nodes in the first forwarding sub-path are all the first network nodes, and then the node pair is determined for the second forwarding sub-path. The efficiency of forwarding path generation is improved while ensuring that the determined node pair is accurate.

In an example of the disclosure, the sub-path generating unit 403B is specifically configured to perform path calculation based on the topology information of the fourth network nodes and the topology information of the second network nodes by using the target path calculation algorithm to generate a second forwarding sub-path from the third network node to the tail node.

In this example, the apparatus further includes:
a BSID adding module configured to, after the next hop updating module obtains the forwarding path communicated from the source node to the tail node, when generating a segment list of the communicated forwarding path, add a binding segment identifier (BSID) between a first segment identifier (SID) and a second SID, so that the first node in a first node pair invokes a SRv6 forwarding strategy corresponding to the BSID to select a forwarding path to the second node in the first node pair. The forwarding strategy corresponding to the BSID uses the target path calculation algorithm. The first node pair is a node pair in the communicated forwarding path. The first SID is a SID corresponding to the first node in the first node pair, and the second SID is a SID corresponding to the second node in the first node pair.

When a segment list of the communicated forwarding path is generated in the solution provided in this example, a BSID is added between the first SID and the second SID, while the path calculation algorithm used by the forwarding strategy corresponding to the BSID is the target path calculation algorithm, and the second forwarding sub-path before update is also generated by using the target path calculation algorithm. Therefore, the first node in the node pair can therefore perform path selection according to the second forwarding sub-path before update, and forward the SRv6 packet to the second node in the node pair, thereby effectively ensuring accurate forwarding of the SRv6 packet.

In an example of the present disclosure, the apparatus further includes: an information adding module configured to, adding security authentication instructions and instruction parameters of the security authentication instructions into function fields of a SID corresponding to nodes in the first node pair when the segment list of the communicated forwarding path is generated.

In this way, after the first node and the second node in each node pair receive the SRv6 packet to be forwarded, they can execute the security authentication instruction carried in the SID according to the instruction parameters carried in the SID, thereby ensuring the security of the SRv6 packet to be forwarded.

In an example of the disclosure, the sub-path generating unit 403B is specifically configured to perform path calculation based on the topology information of the fourth network nodes and the topology information of the second network nodes by using a shortest path first algorithm to generate the second forwarding sub-path from the third network node to the tail node.

In this way, after the first node in the node pair receives the SRv6 packet, it can directly perform path selection according to the shortest path first algorithm, and then forward the SRv6 packet to the second node in the node pair. Therefore, SRv6 packet forwarding can be accurately realized, and the information quantity of information carried by SRv6 packet can be reduced.

In an example of the present disclosure, the path obtaining module 403 is specifically configured to send a path request to a control node when there is a path interruption in the first forwarding path; receive a second forwarding path fed back by the control node, wherein the second forwarding path is a forwarding path from the source node to the tail node determined by the control node based on topology information of first network nodes and topology information of second network nodes.

As can be seen from the above, in the solution provided in this example, the control node can gain knowledge of path calculation algorithms supported by network nodes in the network and the topology information of network nodes, a relatively accurate forwarding path can be generated. In addition, the control node implements the generation of the second forwarding path, thereby relieving the work pressure of the network node as the execution entity.

Corresponding to the method for generating a forwarding path, examples of the present disclosure also provide a network device.

Figure 6:
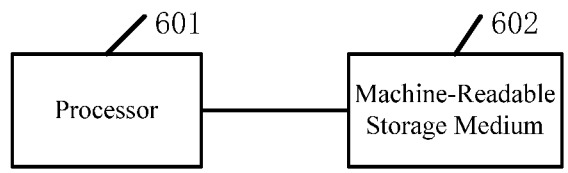
FIG. 6 is a schematic structural diagram of a network device according to an example of the present disclosure.

Referring to FIG. 6, FIG. 6 provides a schematic structural diagram of a network device, the network device includes: a processor 601 and a machine-readable storage medium 602. The machine-readable storage medium 602 stores machine-executable instructions executable by the processor 601. The processor 601 is caused by the machine-executable instructions to implement steps of the method for generating a forwarding path described in the foregoing method examples.

Corresponding to the method for forwarding path generation, examples of the present disclosure further provides a machine-readable storage medium storing machine-executable instructions which, when called and executed by a processor, cause the processor to implement the steps of the method for generating a forwarding path described in the foregoing method examples.

Corresponding to the method for forwarding path generation, examples of the present disclosure further provides a computer program product containing instructions which, when executed on a computer, cause the computer to perform the steps of the method for generating a forwarding path described in the foregoing method examples.

It should be noted that the above machine-readable storage medium may include Random Access Memory (RAM) and Non-Volatile Memory (NVM), for example, at least one disk Memory. Alternatively, the above machine-readable storage medium may be at least one storage located far away from the aforementioned processor.

The processor may be a general-purpose processor, including Central Processing Unit (CPU), Network Processor (NP), and the like; it can also be Digital Signal Processors (DSPs), Disclosure Specific Integrated Circuits (ASICs), Field Programmable Gate Arrays (FPGAs) or other Programmable logic devices, discrete Gate or transistor logic devices, discrete hardware components.

Herein, relational terms such as first and second, and the like are used to distinguish one entity or operation from another entity or operation without necessarily requiring or implying any actual such relationship or order between such entities or operations. Also, the terms "include", "contain" or any other variation thereof, are intended to cover a non-exclusive inclusion, such that a process, method, article, or device including a series of elements include not only those elements, but also other elements that are not explicitly listed, or include elements inherent to the process, method, article, or device. Without further limitation, the element defined by the sentence "including an . . . " does not exclude the presence of other identical elements in the process, method, article, or device that includes the element.

All examples in the present specification are described in a related manner, and the same and similar parts among examples can be referred to each other, and each example focuses on differences from other examples. In particular, for the apparatus, network device, machine-readable storage medium, and computer program product examples, the description is relatively simple as it is substantially similar to the method examples, and reference may be made to some descriptions of the method examples for relevant parts.

The above are only preferred examples of the present disclosure and are not intended to limit the present disclosure. Any modifications, equivalents, improvements and the like made within the spirit and principle of the present disclosure should be included in the scope of the present disclosure.

What is claimed is:

1. A method for generating a forwarding path, comprising:
obtaining topology information of first network nodes supporting a target path calculation algorithm;
performing, using the target path calculation algorithm, path calculation based on the topology information of the first network nodes to generate a first forwarding path, wherein the first forwarding path is a forwarding path from a designated source node to a designated tail node in the first network nodes;
obtaining a second forwarding path from the source node to the tail node when there is a path interruption in the first forwarding path, wherein the second forwarding path is a forwarding path determined based on topology information of all the first network nodes and topology information of second network nodes, and the second network nodes do not support the target path calculation algorithm;
determining, from the second forwarding path, first network nodes communicated with second network nodes to obtain node pairs; and
updating a next hop device of a first node in each node pair on the second forwarding path as a second node in the node pair to obtain a forwarding path communicated from the source node to the tail node, the second node is located behind the first node in each node pair in a direction of the second forwarding path.

2. The method of claim 1, wherein obtaining a second forwarding path from the source node to the tail node comprises:
determining a third network node in the first forwarding path where a path interruption occurs, and determining a first forwarding sub-path from the source node to the third network node; and
generating a second forwarding sub-path from the third network node to the tail node based on topology information of fourth network nodes and topology information of second network nodes, the fourth network nodes being first network nodes that are not located in the first forwarding sub-path;
wherein determining, from the second forwarding path, first network nodes communicated with second network nodes to obtain node pairs comprises:
determining, from the second forwarding sub-path, first network nodes in communication with second network nodes to obtain node pairs;
wherein updating a next hop device of a first node in each node pair on the second forwarding path as a second node in the node pair to obtain a forwarding path communicated from the source node to the tail node comprises:
updating the next hop device of the first node in each node pair on the second forwarding sub-path as the second node in the node pair; and
connecting the first forwarding sub-path and the updated second forwarding sub-path to obtain a forwarding path communicated from the source node to the tail node.

3. The method of claim 2, wherein generating a second forwarding sub-path from the third network node to the tail node based on topology information of fourth network nodes and topology information of second network nodes comprises:
performing path calculation based on the topology information of the fourth network nodes and the topology information of the second network nodes by using the target path calculation algorithm to generate the second forwarding sub-path from the third network node to the tail node;

after connecting the first forwarding sub-path and the updated second forwarding sub-path to obtain a forwarding path communicated from the source node to the tail node, the method further comprises:

when generating a segment list of the communicated forwarding path, adding a binding segment identifier BSID between a first segment identifier SID and a second SID, so that the first node in a first node pair invokes a SRv6 forwarding strategy corresponding to the BSID to select a forwarding path to the second node in the first node pair, wherein, the forwarding strategy corresponding to the BSID uses the target path calculation algorithm, the first node pair is a node pair in the communicated forwarding path, the first SID is a SID corresponding to the first node in the first node pair, and the second SID is a SID corresponding to the second node in the first node pair.

4. The method of claim 3, further comprising:

when generating the segment list of the communicated forwarding path, adding security authentication instructions and instruction parameters of the security authentication instructions into function fields of a SID corresponding to each node in the first node pair.

5. The method of claim 2, wherein generating a second forwarding sub-path from the third network node to the tail node based on topology information of fourth network nodes and topology information of second network nodes comprises:

performing path calculation based on the topology information of the fourth network nodes and the topology information of the second network nodes by using a shortest path first algorithm to generate the second forwarding sub-path from the third network node to the tail node.

6. The method of claim 1, wherein obtaining a second forwarding path from the source node to the tail node comprises:

sending a path request to a control node; and receiving a second forwarding path fed back by the control node, wherein the second forwarding path is a forwarding path from the source node to the tail node determined by the control node based on topology information of all the first network nodes and topology information of second network nodes.

7. A network device, comprising a processor and a machine-readable storage medium having processor executable instructions stored thereon which, when executed by the processor, cause the processor to carry out operations of:

obtaining topology information of first network nodes supporting a target path calculation algorithm;

performing, using the target path calculation algorithm, path calculation based on the topology information of the first network nodes to generate a first forwarding path, wherein the first forwarding path is a forwarding path from a designated source node to a designated tail node in the first network nodes;

obtaining a second forwarding path from the source node to the tail node when there is a path interruption in the first forwarding path, wherein the second forwarding path is a forwarding path determined based on topology information of all the first network nodes and topology information of second network nodes, and the second network nodes do not support the target path calculation algorithm;

determining, from the second forwarding path, first network nodes communicated with second network nodes to obtain node pairs; and updating a next hop device of a first node in each node pair on the second forwarding path as a second node in the node pair to obtain a forwarding path communicated from the source node to the tail node, the second node is located behind the first node in each node pair in a direction of the second forwarding path.

8. The network device of claim 7, wherein the processor executable instructions, when executed by the processor, cause the processor to specifically carry out operations of:

determining a third network node in the first forwarding path where a path interruption occurs, and determining a first forwarding sub-path from the source node to the third network node; and generating a second forwarding sub-path from the third network node to the tail node based on topology information of fourth network nodes and topology information of second network nodes, the fourth network nodes being first network nodes that are not located in the first forwarding sub-path;

determining, from the second forwarding sub-path, first network nodes in communication with second network nodes to obtain node pairs;

updating the next hop device of the first node in each node pair on the second forwarding sub-path as the second node in the node pair; and connecting the first forwarding sub-path and the updated second forwarding sub-path to obtain a forwarding path communicated from the source node to the tail node.

9. The network device of claim 8, wherein the processor executable instructions, when executed by the processor, cause the processor to specifically carry out operations of:

performing path calculation based on the topology information of the fourth network nodes and the topology information of the second network nodes by using the target path calculation algorithm to generate the second forwarding sub-path from the third network node to the tail node;

wherein after connecting the first forwarding sub-path and the updated second forwarding sub-path to obtain a forwarding path communicated from the source node to the tail node, the processor executable instructions, when executed by the processor, cause the processor to further carry out an operation of:

when generating a segment list of the communicated forwarding path, adding a binding segment identifier BSID between a first segment identifier SID and a second SID, so that the first node in a first node pair invokes a SRv6 forwarding strategy corresponding to the BSID to select a forwarding path to the second node in the first node pair, wherein, the forwarding strategy corresponding to the BSID uses the target path calculation algorithm, the first node pair is a node pair in the communicated forwarding path, the first SID is a SID corresponding to the first node in the first node pair, and the second SID is a SID corresponding to the second node in the first node pair.

10. The network device of claim 9, the processor executable instructions, when executed by the processor, cause the processor to further carry out an operation of:

when generating the segment list of the communicated forwarding path, adding security authentication instructions and instruction parameters of the security authentication instructions into function fields of a SID corresponding to each node in the first node pair.

11. A non-transitory machine-readable storage medium having machine-executable instructions stored thereon which, when called and executed by a processor, cause the processor to implement the method of claim 1.

12. The network device of claim 7, wherein the processor executable instructions, when executed by the processor, cause the processor to specifically carry out operations of:
   sending a path request to a control node; and
   receiving a second forwarding path fed back by the control node, wherein the second forwarding path is a forwarding path from the source node to the tail node determined by the control node based on topology information of all the first network nodes and topology information of second network nodes.

13. The network device of claim 11, wherein the processor executable instructions, when executed by the processor, cause the processor to specifically carry out an operation of:
   performing path calculation based on the topology information of the fourth network nodes and the topology information of the second network nodes by using a shortest path first algorithm to generate the second forwarding sub-path from the third network node to the tail node.

* * * * *